Patented Mar. 28, 1944

2,345,378

UNITED STATES PATENT OFFICE 2,345,378

COFFEE EXTRACTION PROCESS

Robert Louis Brandt, New York, N. Y., assignor to Coffee Products Corporation, New York, N. Y., a corporation of New York No Drawing. Application March 24, 1942,
Serial No. 435,951

9 Claims. (Cl. 99—71)

This invention relates to a method of treating coffee, and more particularly is directed to a process of extracting roasted coffee with a low boiling inert polar inorganic solvent, preferably liquid sulfur dioxide.

It has long been known to extract freshly roasted coffee with a non-aqueous solvent for the purpose of obtaining a concentrated material that contains in part those compounds that impart the aroma and taste characteristics to brewed coffee. In general these solvents have been organic compounds such as alcohol, ethyl ether, hydrocarbons of varying boiling points or ranges and chlorinated hydrocarbons of varying degrees of chlorination. None of the proposed solvents is satisfactory in that each fails to remove a sufficiently high proportion of the desired materials from the coffee, or they remove the bitter and undesirable constituents, or traces of the solvent remain in the extracted products and impart highly undesirable taste to the products as is the case for example with ethyl ether. The solvents may be poisonous, be chemically unstable, uneconomical in use and they remove compounds from the coffee that are undesirable. They may also enter into chemical combination and impart a deleterious taste, or their boiling points may be such that their removal and recovery entails heavy losses of the more volatile and highly valuable constituents in the coffee.

It has now been found, contrary to expectation, that the low boiling polar inorganic solvents, particularly liquid sulfur dioxide, are of unsurpassed excellence when used for separating the aroma-taste principles from roasted coffee. Liquid sulfur dioxide has several properties that lend themselves admirably to the purpose at hand. Its thermal properties permit ease of separation in vapor form from both the liquid sulfur dioxide solution of coffee-extract and from the extracted and sulfur dioxide saturated coffee bean solids. Its very low freezing point and low viscosity allows easy fractional crystallization or separation of the several compounds removed from the original coffee that are collectively soluble in the liquid sulfur dioxide at the coffee-extraction temperature. Sulfur dioxide is non-toxic so that if traces be present in the final products no harm may result from its use as a food stuff. Furthermore, it slowly oxidizes in the presence of water, air and sunlight. Thus, traces left in the products will tend to protect the latter from atmospheric oxidization. Liquid sulfur dioxide is inexpensive, not flammable and chemically stable. It will not decompose with the formation of toxic compounds or enter into combination with compounds present in roasted coffee to cause loss in this way or taste degradation. Finally, its vapor pressure characteristics permit separation from sulfur dioxide coffee extract solutions without substantial loss of the highly volatile aroma-taste principles. But most important is its unsuspected property; that of quantitatively and selectively dissolving the compounds that impart the desired flavor or taste and the aroma characteristics to coffee.

Generally, the process of this invention comprises extraction of substantially dry sub-divided freshly roasted coffee with liquid sulfur dioxide at lowered temperatures, separation of the extract solution from the extracted coffee, and removal of the solvent from the desired constituents by any suitable method, preferably vaporization. It is also possible to chill the extractant with the solute and to filter before the separation of the solvent in vapor form. The solvent-extracted coffee solids may also be heated to remove any retained sulfur dioxide. The sulfur dioxide vapors from the extract and from the coffee solids may be removed and recovered for reuse by compression and chilling. The solvent-freed coffee solids may then be extracted with water or aqueous liquids. The solvent-freed extract may be admixed with coffee powder or with roasted coffee of the same or lower grade.

The following examples will illustrate the use of liquid sulfur dioxide in this process of this invention but are not intended to be limiting on the scope thereof.

*Example I*

Freshly roasted and ground Santos coffee is placed in a vertically disposed pressure-tight iron chamber, internally fitted with a false bottom that is covered with fine mesh screen. The coffee is held in position by a covering screen of fine mesh. A filter bed of shredded asbestos is disposed between the false bottom and the coffee layer. The chamber is totally enclosed and immersed in a suitable temperature control bath. Connections are made to permit withdrawal of liquid from the bottom of the chamber and to allow liquid sulfur dioxide to be fed in at the top. Fittings and connections are also provided to permit evaporation or venting of sulfur dioxide vapors to the atmosphere. The chamber is connected to a source of liquid sulfur dioxide and the charge of coffee is soaked in liquid sulfur dioxide for ten minutes at 5° C. After this time the liquid contents in the chamber are drained into a suitable pressure receiver. The separation of the sulfur dioxide from the sulfur dioxide solution of coffee-extract is carried out by allowing the sulfur dioxide to evaporate at atmospheric pressure and at a temperature of about —9° C. The residue remaining after the separation from sulphur dioxide is brought to room temperature. It contains slight traces of sulfur dioxide. They are removed by gentle heating and the application of vacuum.

This sulfur dioxide free extract is a highly concentrated mixture of the fragrant and taste principles that are separated from the coffee solids by the liquid sulfur dioxide. It is possible to effect a further concentration of the desirable compounds by taking advantage of the differences in solubility in liquid sulfur dioxide at lower temperatures of the compounds comprising the coffee extract, that is by extracting at higher temperatures, e. g., 20° C., under pressure, followed by chilling the separated solution to cause fractional precipitation of the various constituents.

*Example II*

A liquid sulfur dioxide extract of coffee is chilled slowly from —9° C. to —25° C. Throughout this temperature range solid compounds are precipitated from the sulfur dioxide solution. The precipitate, after separation such as by filtering, followed by washing with fresh liquid sulfur dioxide at —25° C. is free of the compounds we desire. It amounts to about twenty-five percent of the starting coffee extract. The precipitate comprises oleaginous compounds contained in the coffee that are soluble in liquid sulfur dioxide at higher coffee extraction temperatures. The concentrated desired constituents are then recovered from the remaining solution by evaporation of the liquid sulfur dioxide.

The liquid sulphur dioxide extract of coffee may be cooled to other low temperatures such as —20° C. or —30° C., followed by filtration at such low temperature.

It is within the scope of this invention to water-extract the solid coffee remaining after the liquid sulfur dioxide extraction, to evaporate the water solution so obtained to dryness and to mix the dried aqueous extract with the solvent-freed liquid sulfur dioxide coffee extract, the mixing preferably taking place under conditions of intense mechanical vibration. The sulfur dioxide extraction operation may be conducted batchwise, continuously or in semi-continuous manner wherein containers filled with fresh coffee are successively extracted with liquid sulfur dioxide in such a way that the container holding the least extracted coffee is contacted with liquid sulfur dioxide having in solution coffee-extract from a previous extraction. It has been found that the coffee-extract obtained from a high grade freshly roasted coffee may be added to a conventional water soluble coffee powder, or to a conventional aqueous coffee brew, both of the latter being made from lower grade coffee, and thus bring their quality very close to the quality of the better coffee. It is also within the scope of this invention to evaporate the sulfur dioxide solution of coffee extract in the presence of substantially dry powder obtained by the aqueous extraction of roasted coffee. Other solvents of the low-boiling inorganic type which may be used in place of liquid sulfur dioxide include liquid carbon dioxide and liquid ammonia. Other decoctable food substances from which aqueous infusions are usually prepared such as tea, maté, sassafras root, chicory and the like may be used in place of or along with the coffee in the present process.

In the preferred method, freshly roasted bean coffee of the desired grade is sub-divided in a totally enclosed mechanical grinder in the substantial absence of oxygen or in the presence of nitrogen or carbon dioxide. Known means are provided to cool or chill the grinder as by circulating cold brine thru jackets enclosing the grinder housing. The ground coffee is directly placed in a thermally insulated solvent extraction pressure vessel and washed in a countercurrent method with liquid sulfur dioxide that is partly saturated with sulfur dioxide soluble coffee extract obtained from a previous pass of this same liquid sulfur dioxide solution over partially exhausted coffee. The saturated sulfur dioxide solution is then removed from the extraction chamber and evaporated to dryness at 0° C. by applying heat. During the later stages of this operation the evaporating chamber is maintained at subatmospheric pressure by applying a vacuum to the system and the temperature is brought to about 20° C. at the end of the evaporation operation. Sulfur dioxide vapors from all stages of the recovery system are suitably dried, compressed and chilled for reuse in the cycle of the solvent extraction process. The sulfur dioxide absorbed by the solid coffee held in the extraction chamber is likewise removed by heating and recovered by compression and chilling. The substantially sulfur dioxide free coffee solids are then extracted with water or aqueous solutions of milk, sugars, gums, surface active agents and/or the like at a temperature of between 10° to 100° C. in a countercurrent manner. The aqueous extract is then taken to dryness be spray-drying or by other known means and the resultant coffee powder mixed with the solvent free sulfur dioxide extract of coffee advantageously by intense mechanical vibration.

The final mixed product so obtained is a brown colored powder that in the dry state has a rich coffee aroma indistinguishable in quality but more pronounced than the aroma from freshly ground coffee from which it originated. The powder dissolves in hot and cold water and forms cup coffee whose flavor, aroma and appearance are the same as coffee brewed by any regular and known methods such as drip or percolator coffee.

The coffee extract obtained by the process of this invention may be employed in soluble coffee powders either as such or when admixed with fillers, such as the mono-, di- and polysaccharides, starches, dextrins, lacteal products from any source as from cow milk, goat milk, etc., either singly or in combination, also when admixed with fillers and gelatine, glycerol, or gums such as gum arabic, gum tragacanth, in aqueous coffee concentrates, as a flavoring compound in food stuffs such as bakery products, candies, prepared beverages, carbonated and still, chewing gum and tobacco, cheese, ice cream, in milk, chocolate, tea and in other drinks, as a flavorant covering in pharmaceuticals, dentifrices, mouth washes and the like, and as a deodorant covering agent in noisome fly and other sprays, etc., and in perfumes, sachets and the like.

It may be used in liquid form either alone or admixed or emulsified with water and/or oils or other solvents like alcohol or emulsified with water with the aid of peptizing or dispersion agents such as the salts or acids of organic sulfonates or sulfates, Turkey red oils, monoglycerides and the like. Anti-oxidants alone or in combination with edible or inedible dispersing agents are also included.

The invention as disclosed in the foregoing is not to be limited except as set forth in the following claims.

I claim:

1. The process for separating the valuable flavor and aroma compounds from roasted coffee beans which comprises extracting roasted coffee with liquid sulfur dioxide.

2. A process for separating the valuable flavor and aroma compounds from coffee beans which comprises extracting coffee with a low boiling, stable, liquid inorganic polar compound having a boiling point not greater than 20° C., separating the liquid extract from the coffee and removing the solvent from the coffee extract.

3. The process for separating the valuable flavor and aroma compounds from roasted coffee beans which comprises extracting roasted coffee with liquid sulfur dioxide, separating the liquid extract from the coffee and removing the solvent from the coffee extract.

4. The process for separating and concentrating the valuable flavor and aroma compounds from freshly roasted coffee beans which comprises extracting at −9° C. with liquid sulfur dioxide and concentrating the valuable flavor and aroma compounds in the sulfur dioxide solution of coffee extract by chilling and filtering at −30° C., and evaporating substantially all of the sulfur dioxide from the filtrate.

5. The process for separating the valuable flavor and aroma compounds from freshly roasted subdivided coffee beans which comprises extracting at 5° C with liquid sulfur dioxide, and separating sulfur dioxide from the solvent exhausted coffee beans by heat and pressure reduction, and the aqueous extraction of the solvent extracted coffee.

6. The process for separating the valuable flavor and aroma compounds from roasted coffee beans which comprises subdividing the coffee beans in an inert atmosphere with cooling, extracting the coffee with liquid sulfur dioxide at 5° C., chilling the sulfur dioxide solution of coffee extract to −20° C., filtering the solution, separating the sulfur dioxide from the filtrate by evaporation, separating the sulfur dioxide absorbed by the solvent exhausted coffee by evaporation, extracting the solvent-freed coffee with an aqueous liquid, drying the acqueous extract and commingling the dried aqueous extract with the sulfur dioxide free coffee extract by intense mechanical vibration.

7. The process for separating the valuable flavor and aroma compounds from freshly roasted coffee beans which comprises counter-current extracting the subdivided pre-chilled coffee beans with liquid sulfur dioxide at 5° C., and then evaporating substantially all of the sulfur dioxide from the sulfur dioxide solution of coffee extract in the presence of substantially dry powdered water soluble coffee.

8. The process for separating the valuable flavor and aroma compounds from freshly roasted coffee beans which comprises counter-current extracting of the subdivided pre-chilled coffee beans with liquid sulfur dioxide at 5° C., and then evaporating substantially all of the sulfur dioxide from the sulfur dioxide solution of coffee extract in the presence of a substantially dry powdered mixture of water soluble coffee and carbohydrates.

9. The process of separating the valuable flavor and aroma compounds from decoctable food substances from which aqueous infusions are usually prepared which comprises extracting such a substance with a liquid sulfur dioxide, separating the liquid sulfur dioxide extract from said substance, and removing the sulfur dioxide from the extract.

ROBERT LOUIS BRANDT.